(12) United States Patent
Zhou et al.

(10) Patent No.: US 8,326,263 B2
(45) Date of Patent: Dec. 4, 2012

(54) METHOD FOR SELECTING POLICY AND CHARGING RULES FUNCTION

(75) Inventors: Xiaoyun Zhou, Shenzhen (CN); Zaifeng Zong, Shenzhen (CN); Tong Rui, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 54 days.

(21) Appl. No.: 12/811,075

(22) PCT Filed: Dec. 1, 2008

(86) PCT No.: PCT/CN2008/073276
§ 371 (c)(1),
(2), (4) Date: Jun. 28, 2010

(87) PCT Pub. No.: WO2009/086759
PCT Pub. Date: Jul. 16, 2009

(65) Prior Publication Data
US 2010/0291923 A1 Nov. 18, 2010

(30) Foreign Application Priority Data

Dec. 27, 2007 (CN) .......................... 2007 1 0186139
Jan. 16, 2008 (CN) .......................... 2008 1 0004533

(51) Int. Cl.
*H04M 11/00* (2006.01)
(52) U.S. Cl. ........................................ 455/408; 455/406
(58) Field of Classification Search .................. 455/406, 455/408
See application file for complete search history.

(56) References Cited

FOREIGN PATENT DOCUMENTS

| CN | 1988722 A | 6/2007 |
|---|---|---|
| CN | 101047988 A | 10/2007 |
| CN | 101047989 A | 10/2007 |
| CN | 101060413 A | 10/2007 |
| CN | 101072170 A | 11/2007 |
| CN | 101198171 A | 6/2008 |
| CN | 101217810 A | 7/2008 |
| WO | WO2007/143940 | * 5/2007 |

OTHER PUBLICATIONS

3GPP TS 23.203 V8.0.0 (Dec. 2007) Technical Specification (a/k/a 3rd Generation Partnership Project; Technical Specification Group Services and System Aspects; Policy and charging control architecture (Release 8)); Global System for Mobile Communications, Dec. 2007.
Liao, Jiajia, Authorized Officer, International Searching Authority (China), International Search Report, International Application Serial No. PCT/CN2008/073276; search completion date: Feb. 13, 2009; mailing date: Mar. 5, 2009.

* cited by examiner

*Primary Examiner* — Brandon Miller
*Assistant Examiner* — Nizar Sivji
(74) *Attorney, Agent, or Firm* — Kolisch Hartwell, PC

(57) ABSTRACT

A method for selecting a policy and charging rules function. When a UE accesses a 3GPP system through a roaming architecture, upon receiving a session establishment request message sent by a PCC client located in the visited network, the DRA in the visited network forwards the message to a selected PCRF of the visited network according to the records stored locally or instructs the PCC client to transmit the session establishment request message to the selected PCRF of the visited network; and the PCRF of the visited network forwards the session establishment request message to a DRA of a home network, then the DRA of the home network forwards the message to the selected PCRF of the home network according to the records stored locally or instructs the PCRF of the visited network to transmit the session establishment request message to the selected PCRF of the home network.

9 Claims, 11 Drawing Sheets

METHOD FOR SELECTING POLICY AND CHARGING RULES FUNCTION

TECHNICAL FIELD

The present invention relates to the field of communication, and in particular, to a method for selecting policy and charging rules function.

BACKGROUND OF THE INVENTION

3GPP (3$^{rd}$ Generation Partnership Project) EPS (Evolved Packet System) is composed of E-UTRAN (Evolved Universal Terrestrial Radio Access Network), MME (Mobility Management Entity), S-GW (Serving Gateway), P-GW (Packet Data Network Gateway), HSS (Home Subscriber Server), 3GPP AAA server (3GPP Authentication, Authorization, and Accounting), PCRF (Policy and Charging Rules Function) and other supporting nodes.

Wherein, MME is responsible for control plane-related work including mobility management, processing of non-access layer signaling, and management of subscriber's mobility management context; S-GW is an access gateway device which is connected with E-UTRAN, and it forwards data between an E-UTRAN and a P-GW and is responsible for buffering paging waiting data. P-GW is a border gateway between 3GPP EPS and a PDN and is responsible for functions such as access of a PDN and data forwarding between an EPS and a PDN.

PCRF is a Policy and Charging Rules Function entity, which interfaces with an operator IP (Internet Protocol) service network through a Rx interface to receive service information; connects with the gateway devices in the network via S7/S7a/S7c interfaces, is responsible for originating establishment of IP bearer, ensures QoS of service data and performs charging control.

FIG. 1 illustrates system architecture of an EPS. As shown in FIG. 1, EPS supports interworking with a non-3GPP network. The interworking with a non-3GPP network is implemented through S2a/b interfaces, and P-GW serves as an anchor between a 3GPP network and a non-3GPP network. In addition, non-3GPP systems are divided into trusted non-3GPP IP access network and untrusted non-3GPP IP access network. Trusted non-3GPP IP access network can directly interface with the P-GW through S2a; untrusted non-3GPP IP access network has to be connected with the P-GW through an ePDG (evolved Packet Data Gateway), and the interface between an ePDG and a P-GW is S2b.

In a conventional 3GPP network, PCEF (Policy and charging enforcement function) only exists in P-GW, so PCRF only needs to interface with P-GW to implement control for all functions. PCRF and P-GW exchange information through a S7 interface. However, when the interface between P-GW and S-GW is based on PMIPv6 (Proxy Mobile IP v6), policy enforcement function of PCEF also partially exists in S-GW, which is referred to as GWCF (Gateway Control Function), also as BBERF (Bearer Binding and Event Reporting Function); a S-GW and a PCRF exchange information through a S7c interface. In the case of accessing through the trusted non-3GPP IP access system, BBERF also resides in the trusted non-3GPP access gateway. A trusted non-3GPP access gateway and a PCRF exchange information through a S7a interface.

When a UE (User Equipment) roams, a S9 interface serves as an interface between PCRF of a home network and PCRF of a visited network; meanwhile AF (Application Function) for providing services for the UE transmits service information for generating a PCC (Policy Charging Control) policy to PCRF through a Rx+ interface.

An EPS system has three types of roaming architectures: one type is called as Home Routed, as shown in FIG. 1, wherein P-GW is in a home network and is provided with IP services by a home network operator (i.e., AF is in the home network); the second type is called as Local Break with home operator's Application Functions only, as shown in FIG. 2; the third type is called as Local Break with visited operator's Application Functions only, as shown in FIG. 3.

There are a plurality of PCRF nodes in one public land mobile network (PLMN) of an EPS, and all of the PCRF nodes belong to one or more Diameter (PCRF) domains (referred to as PCRF domain in short hereinafter), i.e., communication among various PCRF entities are based on Diameter protocol. All PCRFs in one PCRF domain are equal. One connection between the UE and the PDN is called as one IP-CAN (IP Connectivity Access Network) session. A PCC policy of one IP-CAN session is only determined by one PCRF. In order to ensure that all of PCEF, BBERF and AF related with one IP-CAN session are associated to the same PCRF, a logical function module of DRA (Diameter Routing Agent) is incorporated into each PCRF domain in an EPS. When a UE establishes an IP-CAN session to a PDN, the DRA selects a PCRF for this IP-CAN session. PCEF, BBERF and AF related with this IP-CAN session are associated to the selected PCRF through the DRA. However, it is still a problem to be solved as for how a DRA specifically makes an initial selection on PCRF and how to associate PCEF, BBERF and AF related with this IP-CAN session to the same PCRF.

SUMMARY OF THE INVENTION

The technical problem to be solved in the present invention is to provide a method for selecting a PCRF for an IP-CAN session through a DRA so as to associate PCEF, BBERF and AF related with this IP-CAN session to the same PCRF.

The technical scheme adopted in the present invention is to provide a method for selecting a policy and charging rules function, comprising:

when a UE accesses a 3GPP system through an E-UTRAN of a visited network or a trustednon-3GPP IP access network or untrusted non-3GPP IP access network, upon receiving a session establishment request message sent by a PCC client located in the visited network, a Routing Agent (DRA) of the visited network forwarding the session establishment request message to a selected PCRF of the visited network according to records stored locally or instructing the PCC client to transmit the session establishment request message to the selected PCRF of the visited network; and the PCRF of the visited network forwarding the session establishment request message to a DRA of a home network, then the DRA of the home network forwarding the session establishment request message to a selected PCRF of the home network according to records stored locally or instructing the PCRF of the visited network to transmit the session establishment request message to the selected PCRF of the home network; or the PCRF of the visited network forwarding the session establishment request message to the selected PCRF of the home network according to records stored locally.

Furthermore, when the UE accesses the 3GPP system through an untrustednon-3GPP IP, the PCC client comprises: Policy and Charging Enforcement Function (PCEF) and Application Function (AF), and when the UE accesses the 3GPP system through the E-UTRAN or trusted non-3GPP IP, the PCC client further comprises Bearer Binding and Event Reporting Function (BBERF);

the session establishment request message sent by the PCEF is an indication of IP-CAN session establishment message; the session establishment request message sent by the BBERF is a gateway control session establishment indication message; the session establishment request message sent by the AF is an application/service information message.

Furthermore, upon receiving the session establishment request message, the DRA of the visited network searches the records stored locally, and if corresponding records of the IP-CAN session are not found, the DRA of the visited network selects a PCRF of the visited network for the IP-CAN session and records a corresponding relationship between the IP-CAN session and the PCRF of the visited network; and forwards the message to the selected PCRF of the visited network, or instructs the PCC client to transmit the message to the PCRF of the visited network corresponding to the records;

if records of the IP-CAN session are found, the DRA of the visited network forwards the message to the PCRF of the visited network corresponding to the records, or instructs the PCC client to transmit the message to the PCRF of the visited network corresponding to the records.

Furthermore, if receiving the indication of IP-CAN session establishment message, the PCRF of the visited network forwards the message to the DRA of the home network;

if receiving the gateway control session establishment indication message or the application/service information message, the PCRF of the visited network forwards the message to the DRA of the home network, or transmits the message to the corresponding PCRF of the home network according to stored corresponding relationship between the IP-CAN session and the PCRF of the home network.

Furthermore, upon receiving the session establishment request message sent by the PCRF of the visited network, the DRA of the home network searches records stored locally, and if corresponding records of the IP-CAN session are not found, the DRA of the home network selects the PCRF of the home network for the IP-CAN session and records the corresponding relationship between the IP-CAN session and the PCRF of the home network; and forwards the message to the selected PCRF of the home network, or instructs the PCRF of the visited network to transmit the message to the PCRF of the home network corresponding to the records;

if records of the IP-CAN session are found, the DRA of the home network forwards the message to the PCRF of the home network corresponding to the records, or instructs the PCRF of the visited network to transmit the message to the PCRF of the home network corresponding to the records.

Furthermore, upon receiving the indication of IP-CAN session establishment message sent by the DRA of the home network, the PCRF of the home network generating a corresponding PCC policy, and containing the PCC policy into an IP-CAN session establishment acknowledgement message, and forwarding the IP-CAN session establishment acknowledgement message to the PCEF through the DRA of the home network, the PCRF of the visited network and the DRA of the visited network;

upon receiving the indication of IP-CAN session establishment message sent by the PCRF of the visited network, the PCRF of the home network generating a corresponding PCC policy and containing the PCC policy into the IP-CAN session establishment acknowledgement message, and forwarding the IP-CAN session establishment acknowledgement message to the PCEF through the PCRF of the visited network.

Furthermore, upon receiving the gateway control session establishment message sent by the DRA of the home network, the PCRF of the home network generating a corresponding QoS policy and containing the QoS policy into a gateway control session establishment acknowledgement message, and forwarding the gateway control session establishment acknowledgement message to the BBERF through the DRA of the home network, the PCRF of the visited network and the DRA of the visited network;

upon receiving the gateway control session establishment message sent by the PCRF of the visited network, the PCRF of the home network generating a corresponding QoS policy and containing the QoS policy into the a gateway control session establishment acknowledgement message, and forwarding the gateway control session establishment acknowledgement message to the PCEF through the PCRF of the visited network.

Furthermore, upon receiving the application/service information message sent by the DRA of the home network, the PCRF of the home network storing service information contained therein for generating a PCC policy and returning an acknowledgement message to the AF through the DRA of the home network, the PCRF of the visited network and the DRA of the visited network;

upon receiving the application/service information message sent by the PCRF of the visited network, the PCRF of the home network storing service information contained therein for generating a PCC policy and returning an acknowledgement message to the AF through the PCRF of the visited network.

Furthermore, when the UE switches from the E-UTRAN to the trusted or untrusted 3GPP IP access network to access the 3GPP system, or switches inversely, upon receiving an IP-CAN session modification message sent by the PCEF located in the visited network, the DRA of the visited network forwards the IP-CAN session modification message to the corresponding PCRF of the visited network according to stored records of the IP-CAN session; the PCRF of the visited network forwards the IP-CAN session modification message to the DRA of the home network according to UE ID contained in the IP-CAN session modification message, or according to a corresponding relationship locally recorded between the IP-CAN session and the DRA of the home network;

upon receiving the above message, the DRA of the home network forwards the message to the corresponding PCRF of the home network according to stored records of the IP-CAN session; the PCRF of the home network modifies the PCC policy of the IP-CAN session, and contains the modified PCC policy into an IP-CAN session modification acknowledgement message, and transmits the IP-CAN session modification acknowledgement message to the PCEF through the DRA of the home network, the PCRF of the visited network and the DRA of the visited network.

Furthermore, when the UE switches from the E-UTRAN to the trusted or untrusted 3GPP IP, or switches inversely:

upon receiving an IP-CAN session modification message sent by the PCEF located in the visited network, the PCRF of the visited network forwarding the above message to the corresponding PCRF of the home network according to stored records of the IP-CAN session; and the PCRF of the home network modifying a PCC policy of the IP-CAN session, and containing the modified PCC policy into an IP-CAN session modification acknowledgement message, and transmitting the IP-CAN session modification acknowledgement message to the PCEF through the PCRF of the visited network.

Furthermore, the DRA of the visited network instructing the PCC client to transmit the session establishment request message to the selected PCRF of the visited network means: the DRA of the visited network transmitting a redirection message carrying a PCRF address of the visited network to the PCC client, and the PCC client transmitting the session establishment request message to the PCRF of the visited network after receiving the redirection message;

The DRA of the home network instructing the PCRF of the visited network to transmit the session establishment request message to the selected PCRF of the home network means: the DRA of the home network transmitting a redirection message carrying a PCRF address of the home network to the PCRF of the visited network, and the PCRF of the visited network transmitting the session establishment request message to the PCRF of the home network after receiving the redirection message.

To sum up, the present invention provides a method for selecting policy and charging rules function, in which, when a UE is in a Home Routed or Local Break roaming state, a single PCRF of a visited network and a home network can be selected for an IP-CAN session of the UE.

PREFERRED EMBODIMENTS OF THE INVENTION

The technical scheme of the present invention will be described below in detail with reference to accompany drawings and examples.

In the following examples, PCEF, BBERF and AF can be collectively called as a PCC client, indication of IP-CAN session establishment request message, gateway control session establishment indication message and application/service information message can be collectively called as a session establishment request message.

EXAMPLE ONE

Figure 1:
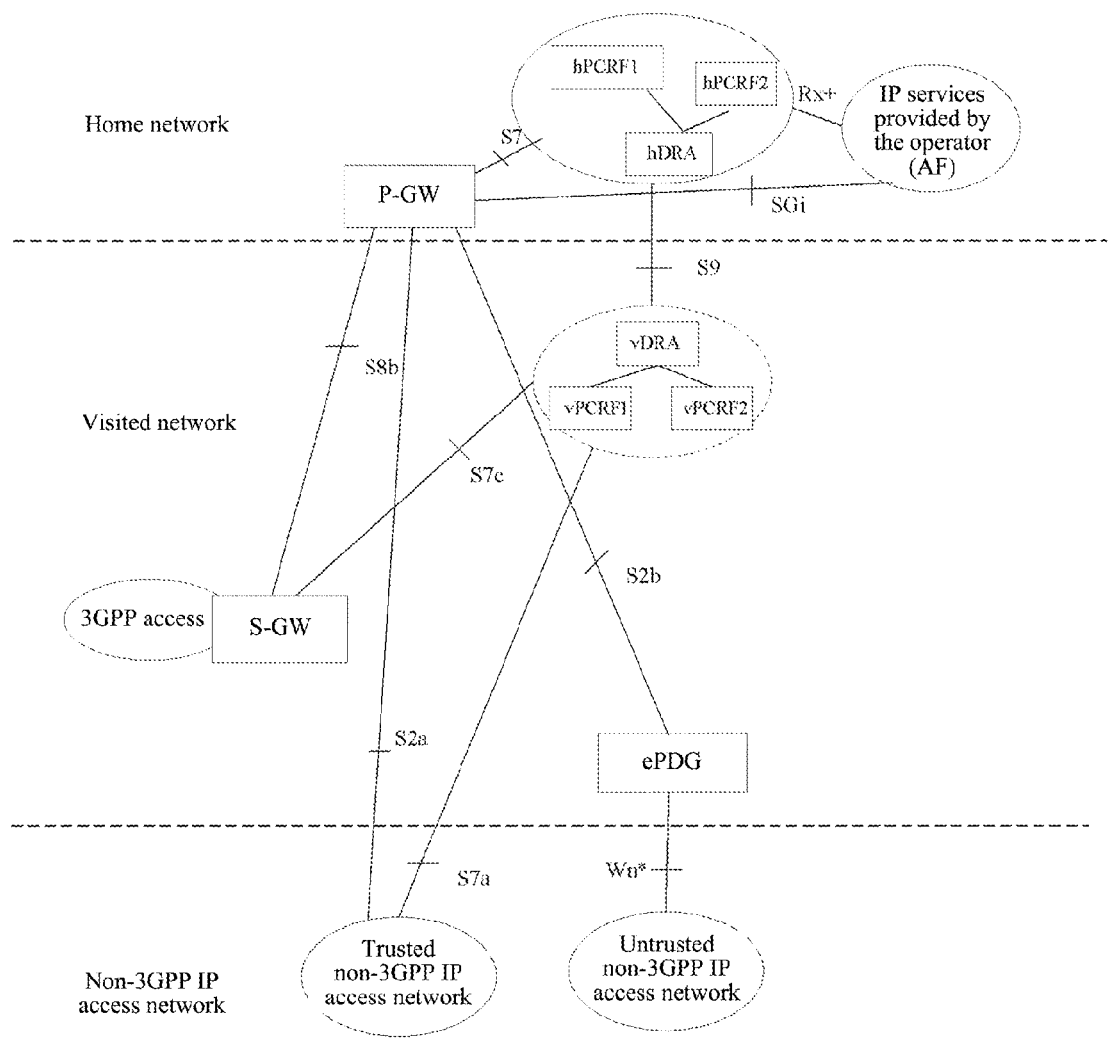
FIG. 1 illustrates a Home Routed roaming architecture of an EPS system.

This example describes: a flow of a P-GW selecting a PCRF in a process of establishing an IP-CAN session when a UE adopts a Home Routed roaming architecture (as shown in FIG. 1) and accesses a 3GPP system through an E-UTRAN, a trusted non-3GPP IP access network, or a untrusted non-3GPP IP access network, a flow of a S-GW or a trusted non-3GPP access gateway finding the PCRF selected by the P-GW, and a flow of an AF finding the PCRF selected by the P-GW when a UE originates a service request based on the IP-CAN session to trigger the AF providing the service to provide application/service information for the PCRF.

Figure 4A:
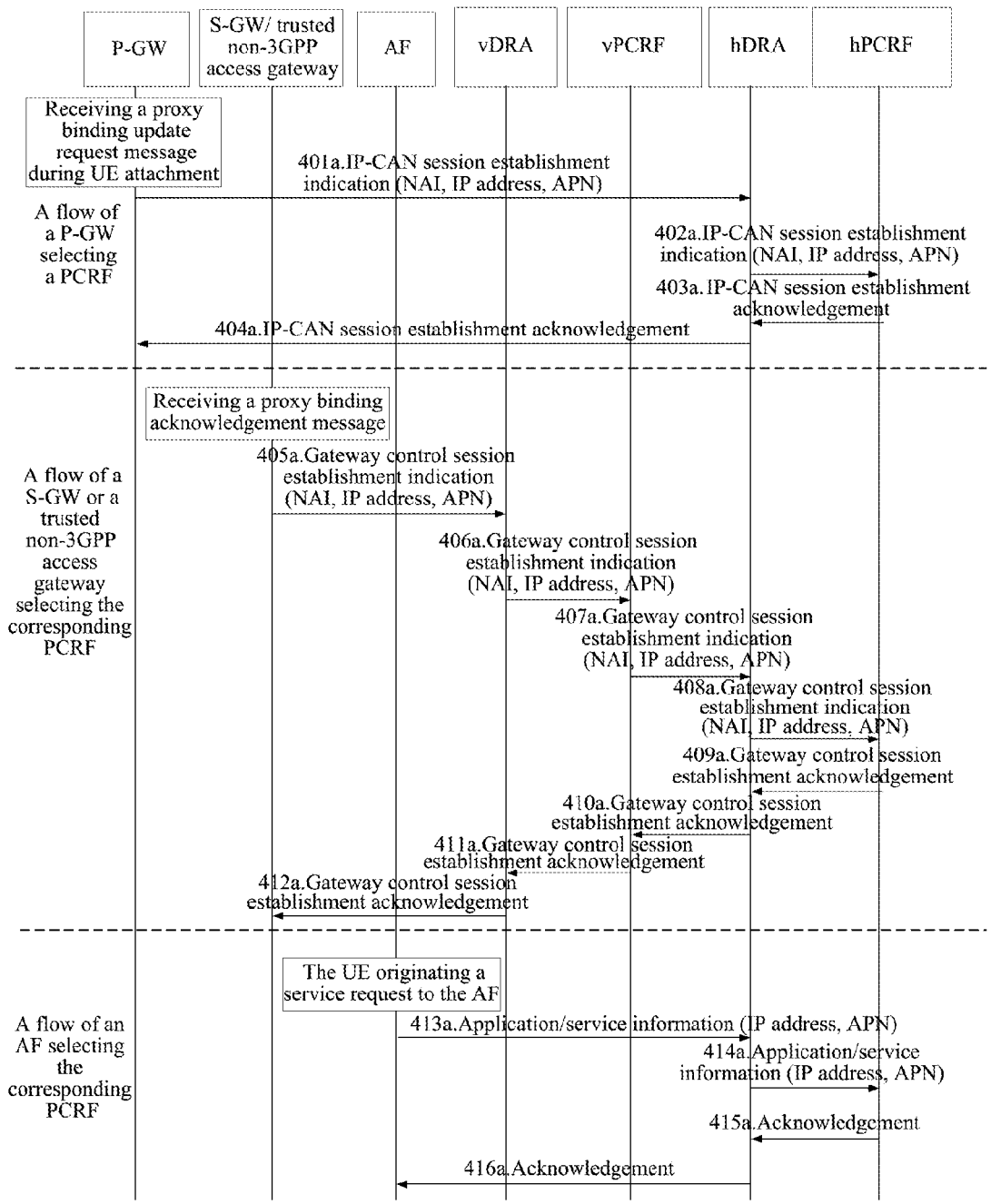
FIG. 4a is a flow chart indicating a DRA directly forwarding a received message according to Example One of the present invention.

The flow chart for indicating hDRA and vDRA directly forwarding a received message according to this example is shown in FIG. 4a, wherein each step is described as follows:

401a, during UE attachment, after receiving a proxy binding request message sent by a S-GW or a trusted non-3GPP IP access gateway, a P-GW transmitting an indication of IP-CAN session establishment request message, wherein the P-GW is located in the home network of the UE as a PCEF entity, and the message is sent to a DRA of the home network (written as hDRA);

The above "indication of IP-CAN session establishment" request message carries: NAI (Network Access Identifier), IP address of the UE and APN (Access Point Name) of a PDN to be accessed.

402a, the hDRA searching information locally stored according to NAI, IP address and APN, and since no record of the IP-CAN session is found, the hDRA selecting a PCRF of the home network (written as hPCRF) for the P-GW, and establishing and storing a corresponding relationship between the IP-CAN session and the hPCRF: (NAI, IP address, APN, hPCRF address), and forwarding the request message to the hPCRF;

403a, the hPCRF generating a PCC policy according to subscription information of the subscriber, network policy, etc., and identifying the IP-CAN session with a tuple (NAI, IP address, APN); hPCRF transmitting an "IP-CAN session establishment acknowledgement" message containing the above PCC policy to the hDRA to issue the PCC policy;

404a, the hDRA forwarding the above "IP-CAN session establishment acknowledgement" message to the P-GW, and the P-GW installing PCC rules according to the PCC policy contained in the message;

405a, after the S-GW or the trusted non-3GPP access gateway receiving an Proxy binding acknowledgement message sent by the P-GW, the S-GW or the trusted non-3GPP access gateway transmitting a gateway control session establishment message; wherein the message carries NAI, IP address and APN; the S-GW or the trusted non-3GPP access gateway is located in a visited network of the UE as a BBERF entity, and the message is transmitted to a DRA of the visited network (written as vDRA);

406a, the vDRA searching information locally stored according to the NAI, IP address and APN, and since no record of the IP-CAN session is found, the vDRA selecting a vPCRF for the S-GW or the trusted non-3GPP access gateway, and establishing and storing a corresponding relationship between the IP-CAN session and the vPCRF: (NAI, IP address, APN, vPCRF address), and forwarding the "gateway control session establishment" request message to the vPCRF;

407a, since the vPCRF does not find records of the IP-CAN session according to NAI, IP address and APN, the vPCRF establishing records for the IP-CAN session, and identifying the IP-CAN session with a tuple (NAI, IP address, APN); meanwhile, forwarding the "gateway control session establishment" request message to the hDRA according to the NAI, establishing and storing a corresponding relationship (NAI, IP address, APN, hDRA address);

408a, the hDRA searching information locally stored according to the NAI, IP address and APN, finding that a hPCRF has already been selected for the IP-CAN session, and then forwarding the "gateway control session establishment" request message to the hPCRF;

409a, the hPCRF searching information locally stored according to NAI, IP address and APN, finding that the IP-CAN session has been registered, and then associating the gateway control session to the IP-CAN session, and generating a QoS policy according to the subscription information of the subscriber, network policy, etc., and containing the QoS policy into a "gateway control session establishment acknowledgement" message which is transmitted to the hDRA to issue the QoS policy;

410a, the hDRA returning the "gateway control session establishment acknowledgement" message to the vPCRF;

411a, the vPCRF modifying the QoS policy contained in the "gateway control session establishment confirmation" message according to a local policy, and then forwarding the message to the vDRA;

412a, the vDRA forwarding the "gateway control session establishment acknowledgement" message to the S-GW or the trusted non-3GPP access gateway, and the S-GW or the trusted non-3GPP access gateway installing the QoS policy;

413a, the UE originating a service request to the AF, the AF transmitting an "application/service information" message which carries IP address and APN, wherein the AF is located in the home network of the UE, and the message is transmitted to the hDRA;

414a, the hDRA searching information locally stored according to the IP address and APN, finding that a hPCRF has already been selected for the IP-CAN session, and then forwarding the message to the hPCRF;

415a, the hPCRF obtaining and storing the service information for generating a PCC policy, and returning an acknowledgement message to the hDRA;

416a, the hDRA forwarding the acknowledgement message to the AF.

Figure 4B:
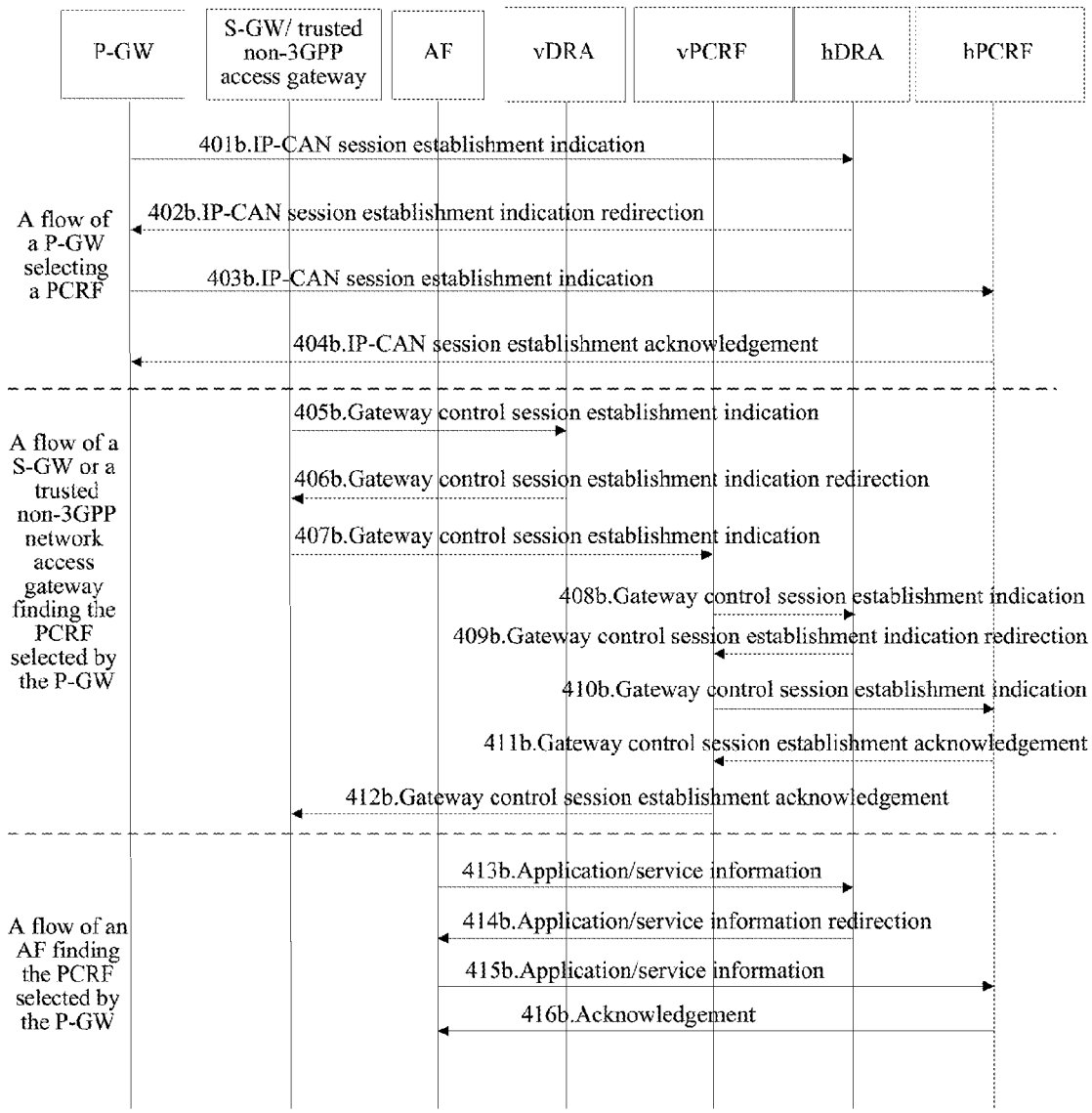
FIG. 4b is a flow chart indicating a DRA returning a redirection message after receiving a message according to Example One of the present invention.

The flow chart indicating hDRA and vDRA returning a redirection message after receiving a message according to this example is shown in FIG. 4b, wherein each step is described as follows:

401b, the P-GW transmitting an "indication of IP-CAN session establishment" request message, wherein since the P-GW is located within the home network of the UE, the message is routed to the home DRA (hDRA), and the message carries NAI, IP address of the UE and APN of PDN to be accessed by the UE;

402b, the hDRA searching the information locally stored according to the NAI, IP address and APN, and since no record of the IP-CAN session is found, the hDRA selecting a home PCRF (hPCRF) for the P-GW, and returning a redirection message carrying the hPCRF address to the P-GW, meanwhile establishing a corresponding relationship (NAI, IP address, APN, hPCRF address);

403b, the P-GW transmitting the "indication of IP-CAN session establishment" request message to the hPCRF, the hPCRF generating a PCC policy according to subscription information of the UE, network policy, etc. and identifying the IP-CAN session with a tuple (NAI, IP address, APN);

404b, the hPCRF returning an "IP-CAN session establishment acknowledgement" message to the P-GW to issue the PCC policy, and the P-GW installing the PCC policy;

405b, the S-GW or the trusted non-3GPP network access gateway transmitting a "gateway control session establishment indication" request message, wherein the message carries NAI, IP address of the UE and APN, the S-GW or the trusted non-3GPP network access gateway is located at a visited network of the UE, and the message is transmitted to a visited DRA (vDRA);

406b, the vDRA searching the stored information according to NAI, IP address and APN, and since no record of the IP-CAN session is found, the vDRA selecting a visited PCRF (vPCRF) for the S-GW or the trusted non-3GPP network access gateway, and returning a redirection message carrying the vPCRF address to the S-GW or the trusted non-3GPP network access gateway, meanwhile establishing a corresponding relationship (NAI, IP address, APN, vPCRF address);

407b, the S-GW or the trusted non-3GPP network access gateway transmitting an "gateway control session establishment indication" request message carrying NAI, IP address and APN to the vPCRF, then the vPCRF searching the stored information according to NAI, IP address and APN; since no record of the IP-CAN session is found, the vPCRF establishing records for the session and identifying the session with a tuple (NAI, IP address and APN);

408b, the vPCRF forwarding the "gateway control session establishment indication" request message to the hDRA according to NAI;

409b, the hDRA searching the stored information according to the NAI, IP address and APN, finding that a hPCRF has already been selected for the IP-CAN session, and then returning the address of the hPCRF to the vPCRF, and the vPCRF storing the corresponding relationship (NAI, IP address, APN, hPCRF address);

410b, the vPCRF transmitting the "gateway control session establishment indication" request message to the hPCRF;

411b, the hPCRF searching the stored information according to the NAI, IP address and APN, finding that the IP-CAN session already exists, and then associating the gateway control session to the IP-CAN session, and generating a QoS policy according to the subscription information of the UE, network policy, etc., and returning the QoS policy to the vPCRF by a "gateway control session establishment confirmation" message;

412b, the vPCRF modifying the QoS policy according to a local policy, and then forwarding the message to the S-GW or the trusted non-3GPP network access gateway by a confirmation message;

413b, an AF transmitting an "application/service information" request message which carries IP address and APN, wherein the AF is located in the home network of the UE, and the message is transmitted to the hDRA;

414b, the hDRA searching according to IP address and APN, finding that a hPCRF has already been selected for the IP-CAN session, and then returning a redirection message carrying the hPCRF address to the AF;

415b, the AF transmitting the "application/service information" request message carrying IP address and APN to the hPCRF;

416b, the hPCRF generating a PCC policy and a QoS policy and returning a acknowledgement message to the AF to issue these policies.

In the above example, if the UE accesses the 3GPP system via an untrusted non-3GPP, then steps 405a-412a and steps 405b-412b will be omitted.

EXAMPLE TWO

Figure 2:
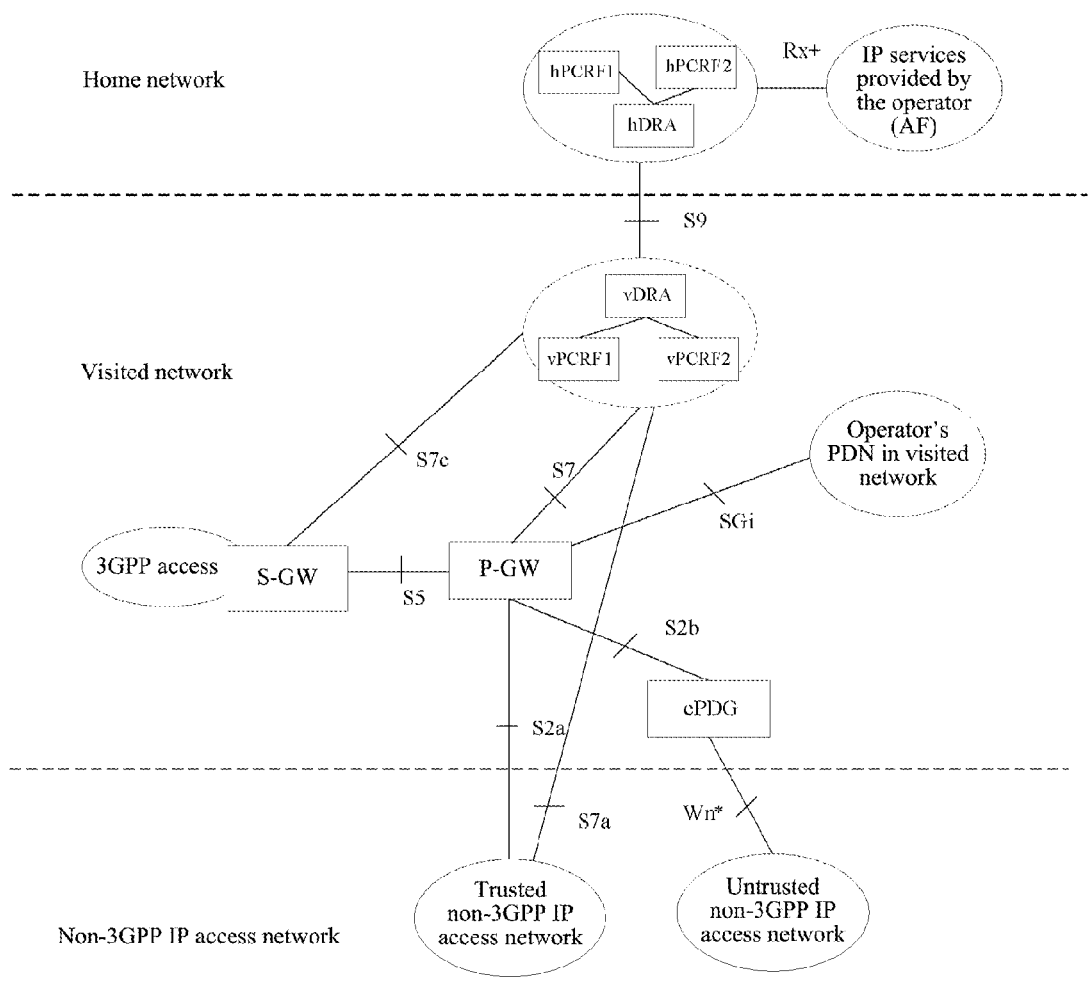
FIG. 2 illustrates a roaming architecture of Local Break with home operator's Application Functions only of an EPS system.

This example describes: a flow of a P-GW selecting a PCRF in a process of establishing an IP-CAN session when a UE adopts roaming architecture of Local Break with home operator's Application Functions only (as shown in FIG. 2) and accesses a 3GPP system through an E-UTRAN, a trusted non-3GPP IP access network, or an untrusted non-3GPP IP access network, a flow of a S-GW or a trusted non-3GPP access gateway finding the PCRF selected by the P-GW, and a flow of an AF finding the PCRF selected by the P-GW when a UE originates a service request based on the IP-CAN session to trigger the AF providing the service to provide application/service information for the PCRF.

Figure 5A:
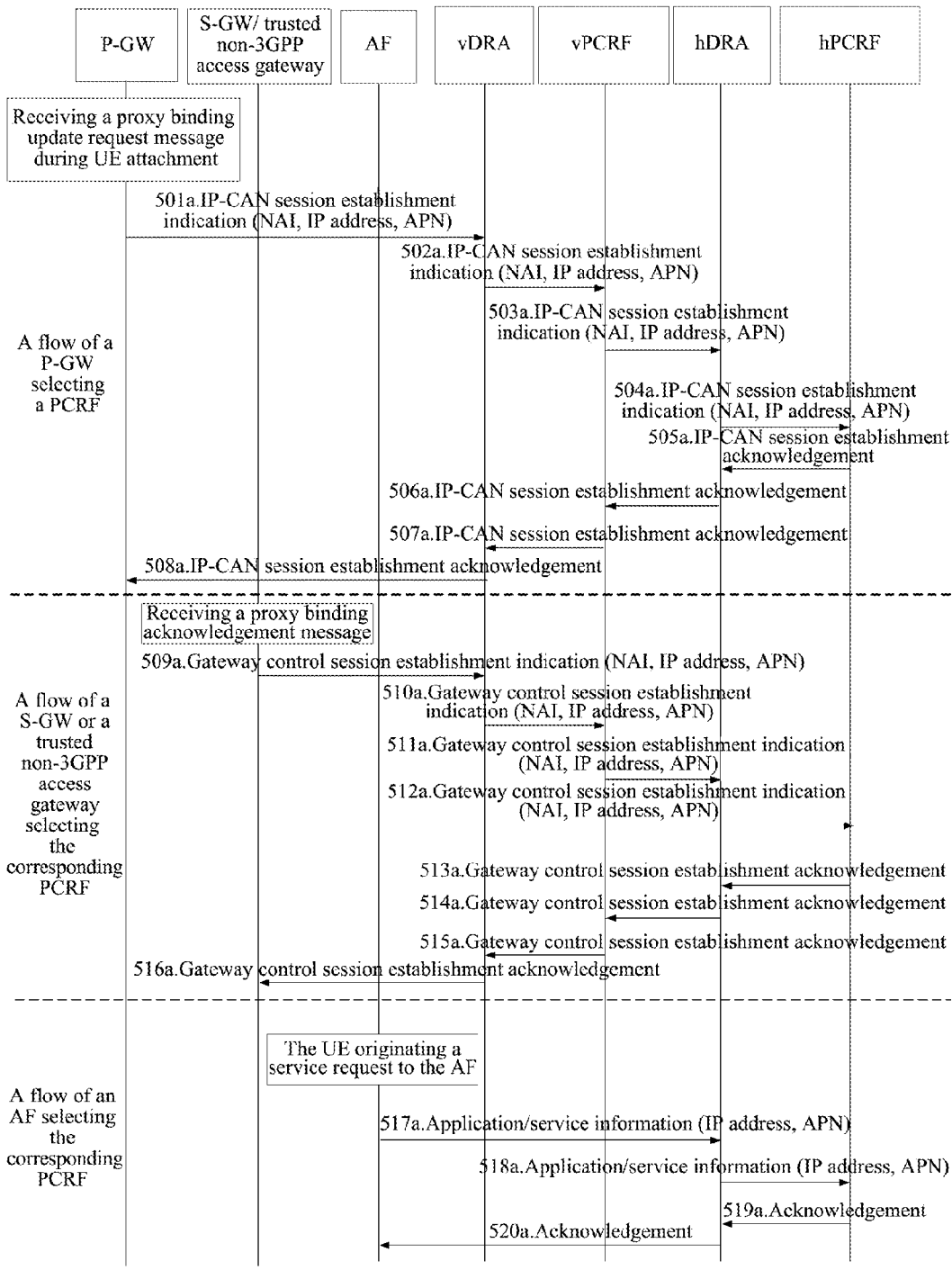
FIG. 5a is a flow chart indicating a DRA directly forwarding a received message according to Example Two of the present invention.

The flow chart for indicating hDRA and vDRA directly forwarding a received message according to this example is shown in FIG. 5a, wherein each step is described as follows:

501a, during UE attachment, after receiving an agent binding updating request message sent by a S-GW or a trusted non-3GPP IP access gateway, a P-GW transmitting an "indication of IP-CAN session establishment" request message, wherein the P-GW is located in the visited network of the UE as a PCEF entity, and the message is sent to a vDRA;

The above "indication of IP-CAN session establishment" request message carries: NAI, IP address of UE and APN of PDN to be accessed.

502a, the vDRA searching the information locally stored according to the NAI, IP address and APN, and since no record of the IP-CAN session is found, the vDRA selecting a vPCRF for the P-GW, and establishing a corresponding relationship between the IP-CAN session and the vPCRF: (NAI, IP address, APN, vPCRF address), and forwarding the "indication of IP-CAN session establishment" request message to the vPCRF;

503a, since the vPCRF does not find records of the IP-CAN session according to the NAI, IP address and APN, the vPCRF establishing records for the IP-CAN session, and identifying the IP-CAN session with a tuple (NAI, IP address, APN); meanwhile, forwarding the "indication of IP-CAN session establishment" request message to the hDRA according to the NAI, establishing a corresponding relationship (NAI, IP address, APN, hDRA address);

504a, the hDRA searching the information locally stored according to the NAI, IP address and APN, and since no record of the IP-CAN session is found, the hDRA selecting a hPCRF for the P-GW, and establishing a corresponding relationship between the IP-CAN session and the hPCRF: (NAI, IP address, APN, hPCRF address), and forwarding the "indication of IP-CAN session establishment" request message to the hPCRF;

505a, the hPCRF generating a PCC policy according to subscription information of the UE and the network policy and identifying the session with a tuple (NAI, IP address, APN); the hPCRF transmitting an "IP-CAN session establishment acknowledgement" message containing the above PCC policy to the hDRA to issue the PCC policy.

506a, the hDRA forwarding the above "IP-CAN session establishment acknowledgement" message to the vPCRF;

507a, the vPCRF modifying the PCC policy contained in the "IP-CAN session establishment acknowledgement" message according to the local policy, and then forwarding the message to the vDRA;

508a, the vDRA forwarding the "IP-CAN session establishment acknowledgement" message to the P-GW, and the P-GW installing PCC rules according to the PCC policy contained in the message;

509a, after the S-GW or the trusted non-3GPP access gateway receiving an agent binding acknowledgement message sent by the P-GW, the S-GW or the trusted non-3GPP access gateway transmitting a "gateway control session establishment" request message; wherein the message carries NAI, IP address and APN; the S-GW or the trusted non-3GPP access gateway is located in a visited network of the UE as a BBERF entity, and the message is transmitted to the vDRA;

510a, the vDRA searching information locally stored according to the NAI, IP address and APN, finding that a vPCRF has already been selected for the IP-CAN session, and then forwarding the "gateway control session establishment" request message to the vPCRF;

511a, the vPCRF searching the information locally stored according to the NAI, IP address and APN, finding a hDRA corresponding to the IP-CAN session, and then transmitting the "gateway control session establishment" request message to the hDRA;

512a, the hDRA searching information locally stored according to the NAI, IP address and APN, finding that a hPCRF has already been selected for the IP-CAN session, and then forwarding the "gateway control session establishment" request message to the hPCRF;

513a, the hPCRF generating a QoS policy according to the subscription information of the subscriber, network policy, etc., and containing the QoS policy into a "gateway control session establishment acknowledgement" message which is transmitted to the hDRA to issue the QoS policy;

514a, the hDRA returning the "gateway control session establishment acknowledgement" message to the vPCRF;

515a, the vPCRF modifying the QoS policy contained in the "gateway control session establishment acknowledgement" message according to the local policy, and then forwarding the message to the vDRA;

516a, the vDRA forwarding the "gateway control session establishment acknowledgement" message to the S-GW or the trusted non-3GPP access gateway, and the S-GW or the trusted non-3GPP access gateway installing the QoS policy;

517a, the UE originating a service request to the AF, the AF transmitting an "application/service information" message which carries IP address and APN, wherein the AF is located in the home network of the UE, and the message is transmitted to the hDRA;

518a, the hDRA searching information locally stored according to the IP address and APN, finding that a hPCRF has already been selected for the IP-CAN session, and then forwarding the message to the hPCRF;

519a, the hPCRF obtaining and storing the service information for generating a PCC policy, and returning the acknowledgement message to the hDRA;

520a, the hDRA forwarding the acknowledgement message to the AF.

Figure 5B:
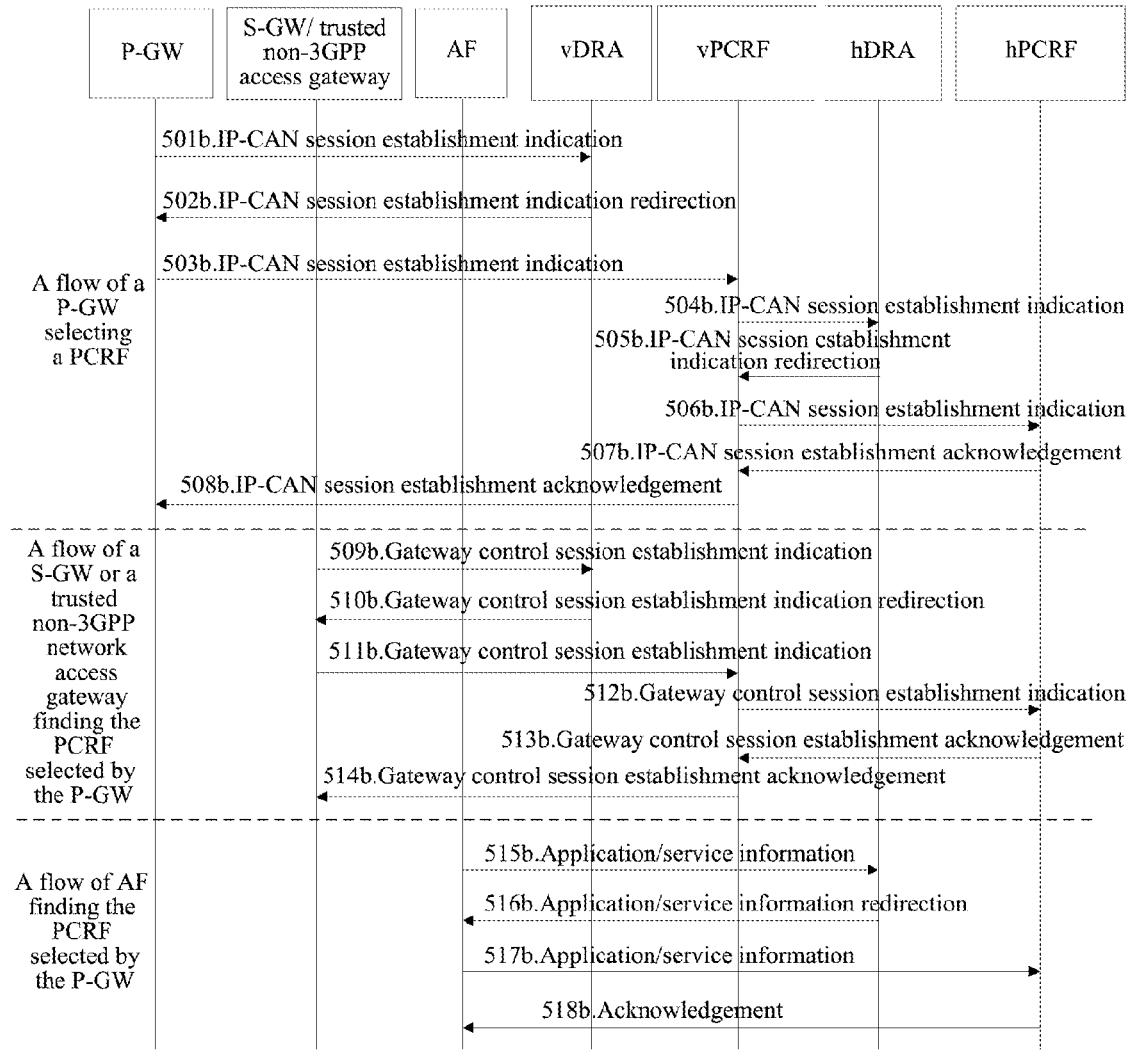
FIG. 5b is a flow chart indicating a DRA returning a redirection message after receiving a message according to Example Two of the present invention.

The flow chart indicating a hDRA and a vDRA returning a redirection message after receiving a message according to this example is shown in FIG. 5b, wherein each step is described as follows:

501b, the P-GW transmitting an "indication of IP-CAN session establishment" request message, wherein since the P-GW is located within the visited network of the UE, the message is routed to the vDRA, and the message carries NAI, IP address and APN;

502b, the vDRA searching the stored information according to the NAI, IP address and APN, and since no record of the IP-CAN session is found, the vDRA selecting a vPCRF for the P-GW, and returning a redirection message carrying the vPCRF address to the P-GW, meanwhile establishing a corresponding relationship (NAI, IP address, APN, vPCRF address);

503b, the P-GW transmitting the "indication of IP-CAN session establishment" request message carrying NAI, IP address and APN to the vPCRF, the vPCRF searching the stored information according to the NAI, IP address and APN, since no record of the IP-CAN session is found, the vPCRF establishing records for the IP-CAN session and identifying the IP-CAN session with a tuple (NAI, IP address, APN);

504b, the vPCRF forwarding a "gateway control session establishment indication" message to the hDRA according to NAI;

505b, the hDRA searching information locally stored according to the NAI, IP address and APN, and since no record of the IP-CAN session is found, the hDRA selecting a hPCRF for the P-GW, and returning a redirection message carrying the hPCRF address to the vPCRF, meanwhile establishing a corresponding relationship (NAI, IP address, APN, hPCRF address) in the hDRA; after receiving the returned message, the vPCRF establishing a corresponding relationship (NAI, IP address, APN, hPCRF address);

506b, the vPCRF transmitting an "indication of IP-CAN session establishment" message to the hPCRF;

507b, the hPCRF generating a PCC policy according to subscription information of the UE, network policy, etc. and identifying the IP-CAN session with a tuple (NAI, IP address, APN), the hPCRF returning an "IP-CAN session establishment acknowledgement" message to the vPCRF to issue the PCC policy;

508b, the vPCRF modifying the PCC policy according to the local policy, and then forwarding it to the P-GW by an acknowledgement message;

509b, the S-GW or the trusted non-3GPP network access gateway transmitting a "gateway control session establishment indication" request message carrying NAI, IP address and APN, wherein the S-GW or the trusted non-3GPP access gateway is located in a visited network of the UE, and the message is transmitted to the vDRA;

510b, the vDRA searching the stored information according to NAI, IP address and APN, finding that a vPCRF has already been selected for the IP-CAN session, and then returning a redirection message carrying the vPCRF address to the S-GW or the trusted non-3GPP network access gateway;

511b, the S-GW or the trusted non-3GPP network access gateway transmitting the "gateway control session establishment indication" request message to the vPCRF, wherein the message carries NAI, IP address and APN;

512b, the vPCRF searching the records according to NAI, IP address and APN, finding that a hPCRF has already been selected for the IP-CAN session, and then transmitting the message to the selected hPCRF;

513b, the hPCRF generating a QoS policy according to the subscription information of the subscriber, network policy, etc., and returning a "gateway control session establishment acknowledgement" containing the QoS policy to the vPCRF;

514b, the vPCRF modifying the QoS policy according to a local policy, and then forwarding the acknowledgement message to the S-GW or the trusted non-3GPP network access gateway;

515b, the AF transmitting an "application/service information" request message which carries IP address and APN, wherein the AF is located in the home network of the UE, and the message is transmitted to the hDRA;

516b, the hDRA searching the stored information according to the IP address and APN, finding that a hPCRF has already been selected for the IP-CAN session, and then returning a redirection message carrying the hPCRF address to the AF;

517b, the AF transmitting an "application/service information" request message which carries IP address and APN to hPCRF;

518b, the hPCRF obtaining the service information to generate a PCC policy and a QoS policy, and returning an acknowledgement message to the AF to issue the policies;

In the above example, if the UE accesses the 3GPP system via an untrusted non-3GPP, then steps 509a-516a and steps 509b-514b will be omitted.

EXAMPLE THREE

Figure 3:
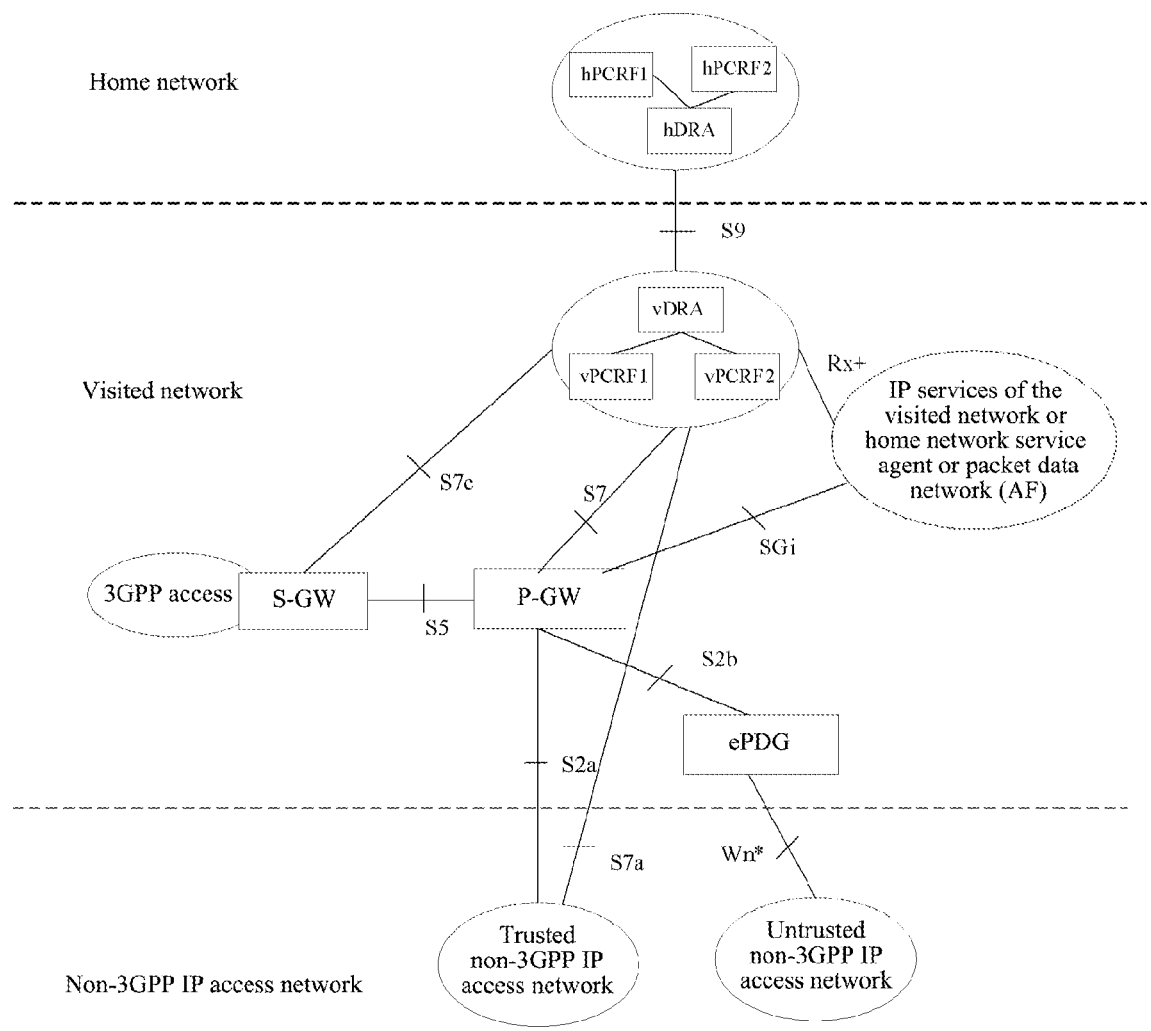
FIG. 3 illustrates a roaming architecture of Local Break, with visited operator's Application Functions only of an EPS system.

This example describes: a flow of a P-GW selecting a PCRF in a process of establishing an IP-CAN session when a UE adopts roaming architecture of Local Break with visited operator's Application Functions only (as shown in FIG. 3) and accesses a 3GPP system through an E-UTRAN, a trusted non-3GPP IP access network, or a untrusted non-3GPP IP access network, a flow of a S-GW or a trusted non-3GPP access gateway finding the PCRF selected by the P-GW, and a flow of an AF finding the PCRF selected by the P-GW when a UE originates a service request based on the IP-CAN session to trigger the AF providing the service to provide application/service information for the PCRF.

Figure 6A:
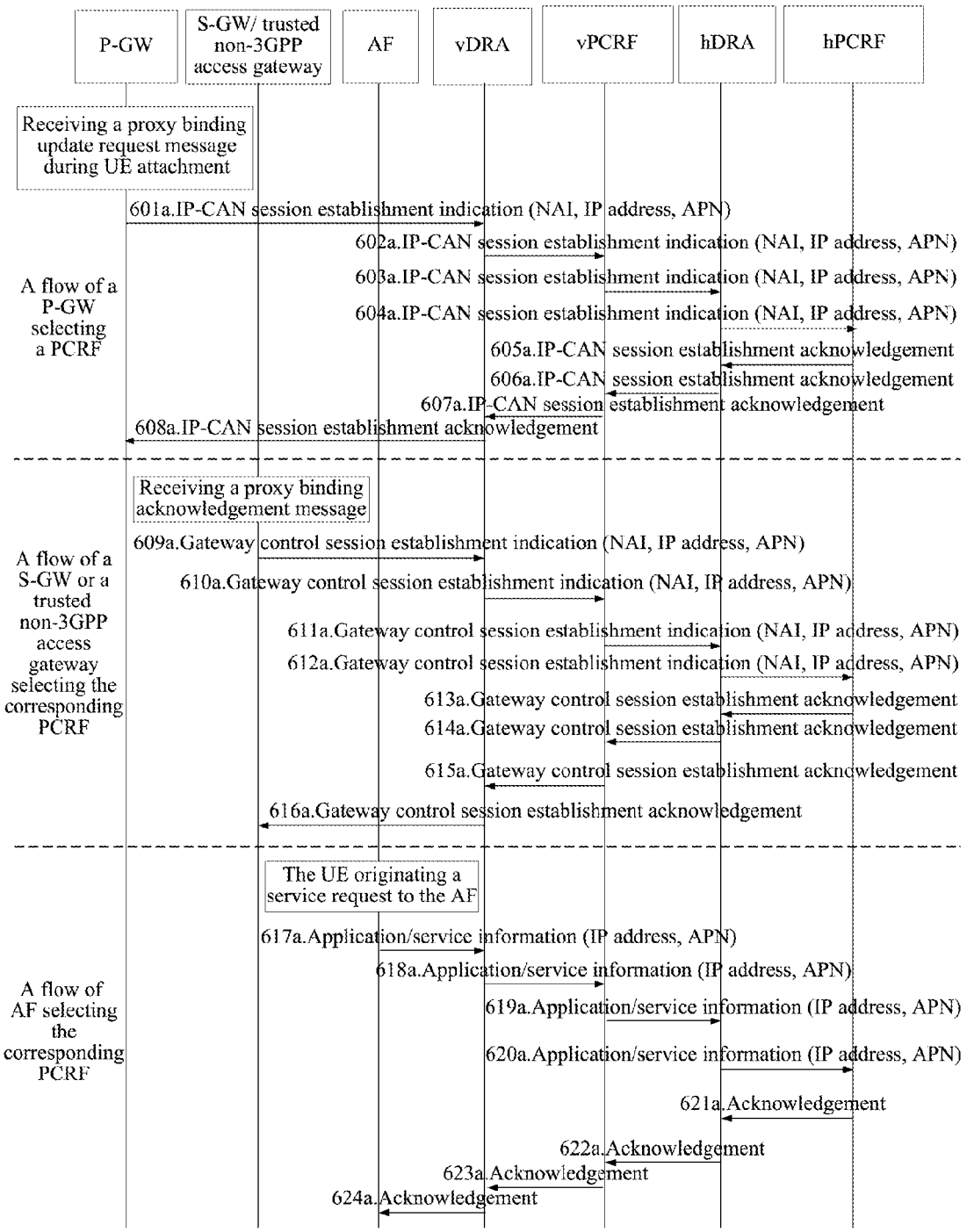
FIG. 6a is a flow chart indicating a DRA directly forwarding a received message according to Example Three of the present invention.

The flow chart for indicating hDRA and vDRA directly forwarding a received message according to this example is shown in FIG. 6a, wherein each step is described as follows:

Steps 601a-616a are the same with steps 501a-516a;

617a, the UE originating a service request to the AF, the AF transmitting an "application/service information" message which carries IP address and APN, wherein the AF is located in the visited network of the UE, and the message is transmitted to the vDRA;

618a, the vDRA searching information locally stored according to the IP address and APN, finding that a vPCRF has already been selected for the IP-CAN session, and then forwarding the "application/service information" message to the vPCRF;

619a, the vPCRF searching information locally stored according to the IP address and APN, finding a hDRA corresponding to the IP-CAN session, and then forwarding the "application/service information" message to the hDRA;

620a, the hDRA searching information locally stored according to the IP address and APN, finding that a hPCRF has already been selected for the IP-CAN session, and then forwarding the message to the hPCRF;

621a, the hPCRF obtaining and storing the service information to generate a PCC policy, and returning an acknowledgement message to the hDRA;

622a, the hDRA forwarding the acknowledgement message to the vPCRF;

623a, the vPCRF forwarding the acknowledgement message to the vDRA;

624a, the vDRA forwarding the acknowledgement message to the AF.

Figure 6B:
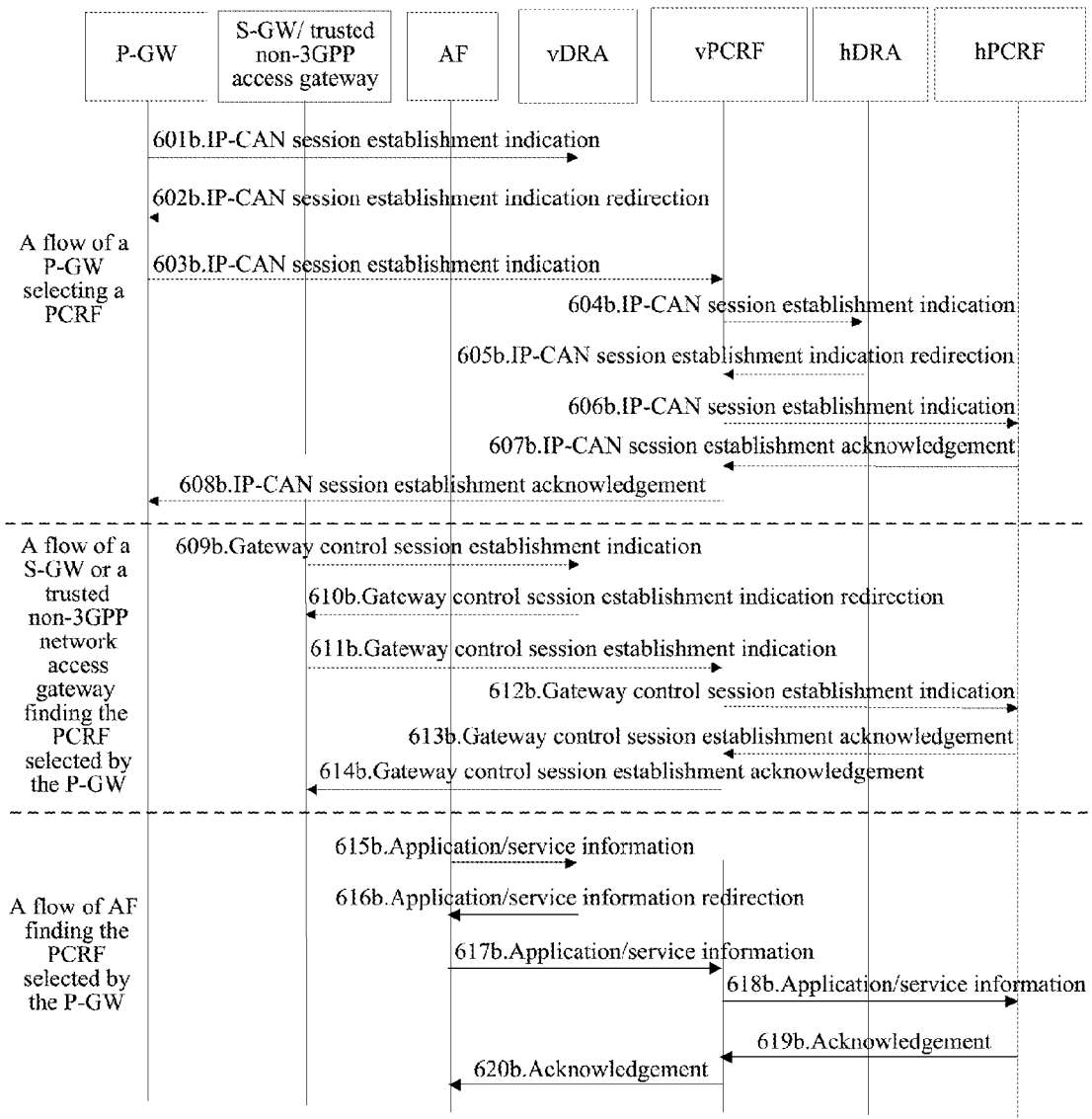
FIG. 6b is a flow chart indicating a DRA returning a redirection message after receiving a message according to Example Three of the present invention.

The flow chart indicating a hDRA and a vDRA returning a redirection message after receiving a message according to this example is shown in FIG. 6b, wherein each step is described as follows:

Steps 601b-614b are the same with steps 501b-514b, and thus will not be described here to avoid repetition;

615b, the AF transmitting an "application/service information" request message which carries IP address and APN, wherein the AF is located in the visited network of the UE, and thus the message is transmitted to the vDRA;

616b, the vDRA searching the stored information according to the IP address and APN, finding that a vPCRF has already been selected for the IP-CAN session, and then returning a redirection message carrying the vPCRF address to the AF;

617b, the AF transmitting an "application/service information" request message which carries IP address and APN to vPCRF;

618b, the vPCRF searching the stored information according to the IP address and APN, finding that a hPCRF has already been selected for the IP-CAN session, and then forwarding the message to the selected hPCRF;

619b, the hPCRF obtaining the service information to generate a PCC policy and a QoS policy, and returning an acknowledgement message to the AF to issue the policies;

620b, the vPCRF modifying the issued policies according to a local policy and then forwarding them to the AF by an acknowledgement message.

In the above example, if the UE accesses the 3GPP system via an untrusted non-3GPP, then steps 609a-616a and steps 609b-614b will be omitted.

EXAMPLE FOUR

This example describes: a flow of a P-GW selecting a PCRF in a process of establishing an IP-CAN session when a UE adopts roaming architecture of Local Break with visited operator's Application Functions only (as shown in FIG. 3) and switches from an E-UTRAN access to a trusted non-3GPP IP access network access or an untrusted non-3GPP IP access network access, a flow of a S-GW or a trusted non-3GPP access gateway finding the PCRF selected by the P-GW, and a flow of an AF finding the PCRF selected by the P-GW when a UE originates a service request based on the IP-CAN session to trigger the AF providing the service to provide application/service information for the PCRF. Wherein communication between S-GW and P-GW adopts a PMIPv6 protocol, and communication among the trusted non-3GPP IP access network or untrusted non-3GPP IP access network and the P-GW adopts PMIPv6 protocol.

Figure 7A:
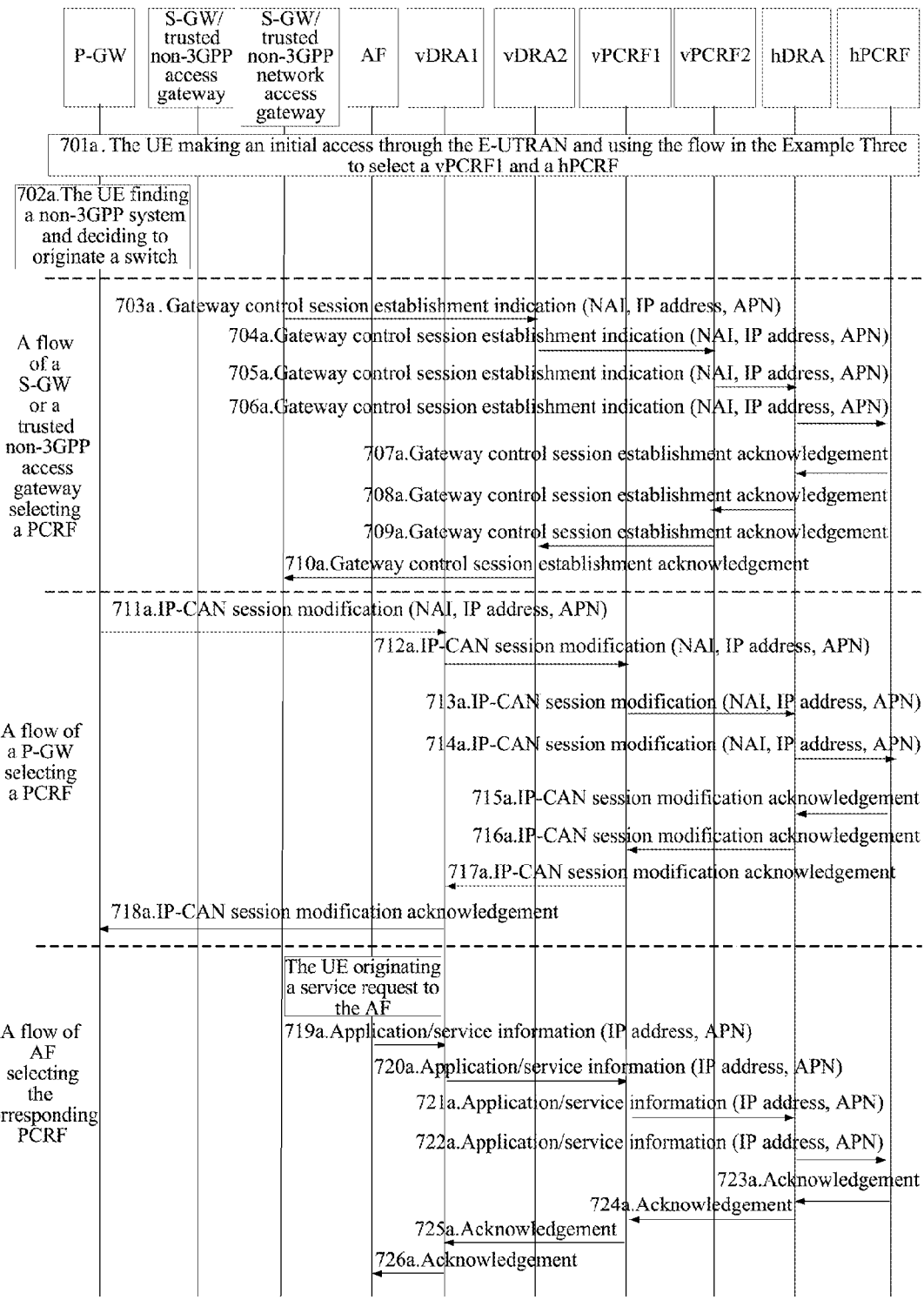
FIG. 7a is a flow chart indicating a DRA directly forwarding a received message according to Example Four of the present invention.

The flow chart for indicating hDRA and vDRA directly forwarding a received message according to this example is shown in FIG. 7a, wherein each step is described as follows:

701a, a UE making an access via E-UTRAN to initially attach to a 3GPP system and establishing a connection to a certain PDN, wherein in this process, the flow in the Example Three is used to select a vPCRF1 through a vDRA1 and a hPCRF through a hDRA;

702a, the UE finding a non-3GPP system (including trusted or untrusted non-3GPP system), and deciding to originate a switch flow; wherein in the switch process, a trusted non-3GPP access gateway and a P-GW are required to interact with a PCRF to obtain a new PCC policy;

703a, in the UE switch process, the trusted non-3GPP access gateway transmitting a "gateway control session establishment" request message after receiving a wireless bearer establishment request; wherein the message carries NAI, IP address and APN; the trusted non-3GPP access gateway is located in a visited network of the UE as a BBERF entity, and its PCRF domain is different from that of the S-GW; the DRA of the PCRF domain where the trusted non-3GPP access gateway is located is vDRA2, so the message is transmitted to the vDRA2;

704a, the vDRA2 searching information locally stored according to the NAI, IP address and APN, and since no record of the IP-CAN session is found, the vDRA2 selecting a PCRF: vPCRF2 for the trusted non-3 GPP access gateway, and establishing a corresponding relationship between the IP-CAN session and the vPCRF2: (NAI, IP address, APN, vPCRF2 address), and forwarding the "gateway control session establishment" request message to the vPCRF2;

705a, since the vPCRF2 does not find records of the IP-CAN session according to the NAI, IP address and APN, the vPCRF2 establishing records for the IP-CAN session, and identifying the IP-CAN session with a tuple (NAI, IP address, APN); meanwhile, forwarding the "gateway control session establishment" request message to the hDRA according to NAI, and establishing a corresponding relationship ((NAI, IP address, APN, hDRA address);

706a, the hDRA searching information locally stored according to the NAI, IP address and APN, finding records of the IP-CAN session, and forwarding the "gateway control session establishment" request message to the corresponding hPCRF;

707a, the hPCRF generating a QoS policy according to subscription information of the subscriber, network policy, etc., and containing the QoS policy into a "gateway control session establishment confirmation" message which is transmitted to the hDRA to issue the QoS policy;

708a, the hDRA returning the "gateway control session establishment acknowledgement" message to the vPCRF2;

709a, the vPCRF2 modifying the QoS policy contained in the "gateway control session establishment acknowledgement" message according to a local policy, and then forwarding the message to the vDRA2;

710a, the vDRA2 forwarding the "gateway control session establishment acknowledgement" message to the trusted non-3GPP access gateway, and the trusted non-3GPP access gateway installing the QoS policy;

711a, since the P-GW does not change after switch, after receiving a agent binding updating request message sent by the trusted non-3GPP access gateway, the P-GW transmitting an "IP-CAN session modification" request message carrying NAI, IP address and APN to the vDRA1;

712a, the vDRA1 searching information locally stored according to the NAI, IP address and APN, finding that a vPCRF1 has already been selected for the IP-CAN session, and then forwarding the "IP-CAN session modification" request message to the vPCRF1;

713a, the vPCRF1 searching information locally stored according to the NAI, IP address and APN, finding a hDRA corresponding to the IP-CAN session, and then forwarding the "IP-CAN session modification" request message to the hDRA;

714a, the hDRA searching the information locally stored according to the NAI, IP address and APN, finding that a hPCRF has already been selected for the IP-CAN session, and then forwarding the "IP-CAN session modification" request message to the hPCRF;

715a, the hPCRF modifying the PCC policy according to subscription information of the subscriber, network policy and the type of the IP-CAN, and containing the modified PCC policy into an "IP-CAN session modification acknowledgement" message which is then transmitted to the hDRA to issue the modified PCC policy;

716a, the hDRA forwarding the "IP-CAN session modification acknowledgement" message to the vPCRF1;

717a, the vPCRF1 modifying the PCC policy contained in the "IP-CAN session modification acknowledgement" message according to the local policy, and then forwarding the message to the vDRA1;

718a, the hDRA1 forwarding the above "IP-CAN session modification acknowledgement" message to the P-GW, and the P-GW installing PCC rules according to the PCC policy contained in the message;

719a, since the AF does not change after the switch, the AF transmitting an "application/service information" message carrying IP address and APN to the vDRA1 when the UE originating a new service request to the AF;

720a, the vDRA1 searching the information locally stored according to the IP address and APN, finding that a vPCRF1 has already been selected for the IP-CAN session, and then forwarding the "application/service information" message to the vPCRF1;

721a, the vPCRF1 searching the information locally stored according to the IP address and APN, finding a hDRA corresponding to the IP-CAN session, and then forwarding the "application/service information" message to the hDRA;

722a, the hDRA searching the information locally stored according to the IP address and APN, finding that a hPCRF has already been selected for the IP-CAN session, and then forwarding the message to the hPCRF;

723a, the hPCRF obtaining and storing the service information to generate a PCC policy, and returning a acknowledgement message to the hDRA;

724a, the hDRA forwarding the acknowledgement message to the vPCRF1;

725a, the vPCRF1 forwarding the acknowledgement message to the vDRA1;

726a, the vDRA1 forwarding the acknowledgement message to the AF.

Figure 7B:
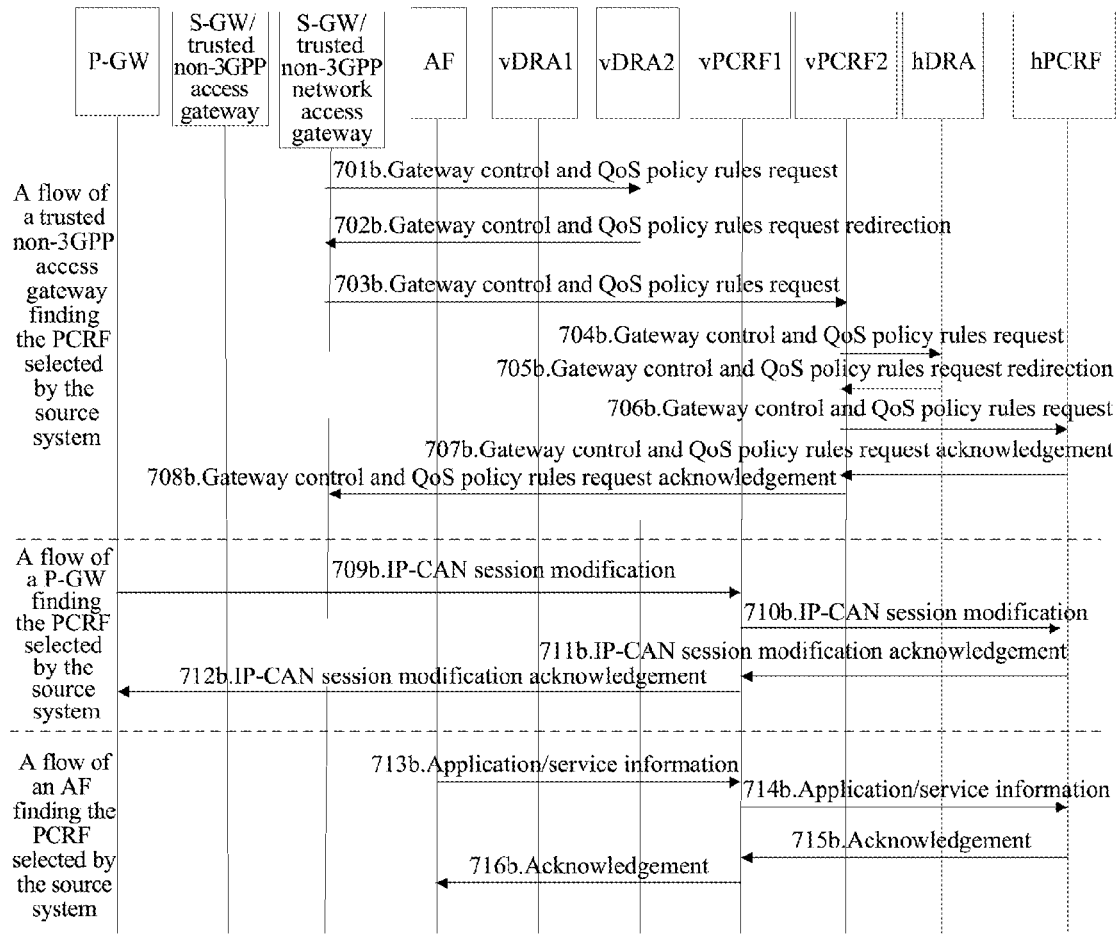
FIG. 7b is a flow chart indicating a DRA returning a redirection message after receiving a message according to Example Four of the present invention.

The flow chart indicating a hDRA and a vDRA returning a redirection message after receiving a message according to this example is shown in FIG. 7b, wherein each step is described as follows:

701b, the trusted non-3GPP network access gateway transmitting a "gateway control and QoS policy rules" request message carrying NAI, IP address and APN, wherein the trusted non-3GPP network access gateway is located in a visited network of the UE and its Diameter (PCRF) domain is different from that of the S-GW, the domain where the trusted non-3GPP network access gateway is located is administered by the vDRA2 and thus the message is transmitted to the vDRA2;

702b, the vDRA2 searching information locally stored according to the NAI, IP address and APN, and since no record of the IP-CAN session is found, the vDRA2 selecting a vPCRF2 for the trusted non-3GPP access gateway and returning a redirection message carrying the vPCRF2 address to the trusted non-3GPP network access gateway, and establishing a corresponding relationship (NAI, IP address, APN, vPCRF2 address);

703b, the trusted non-3GPP network access gateway transmitting the "gateway control and QoS policy rules" request message carrying NAI, IP address and APN to the vPCRF2, the vPCRF2 searching the stored information according to the NAI, IP address and APN, and since no record of the IP-CAN session is found, the vPCRF2 establishing records for the IP-CAN session and identifying the IP-CAN session with a tuple (NAI, IP address, APN);

704b, the vPCRF2 forwarding the "gateway control and QoS policy rules" request message to the hDRA according to the NAI;

705b, the hDRA searching the stored information according to the NAI, IP address and APN, finding the records of the IP-CAN session, and then returning the hPCRF address to the vPCRF2;

706b, the vPCRF2 establishing a corresponding relationship for the IP-CAN session (NAI, IP address, APN, hPCRF address), and transmitting the "gateway control and QoS policy rules" request message to the hPCRF;

707b, the hPCRF generating a QoS policy according to the subscription information of the subscriber, network policy, etc., and returning a "gateway control session establishment acknowledgement" message to the trusted non-3GPP network access gateway to issue the QoS policy;

708b, the vPCRF2 modifying the QoS policy according to a local policy, and then forwarding the modified QoS policy to the trusted non-3GPP network access gateway;

709b, since the P-GW does not change after the switch, the P-GW transmitting an "IP-CAN session modification" request message carrying NAI, IP address and APN to the vPCRF1;

710b, the vPCRF1 finding the records of the IP-CAN session according to NAI, IP address and APN, and forwarding the message to the hPCRF;

711b, the PCRF modifying the PCC policy according to subscription information of the subscriber, network policy and the type of the IP-CAN session, and the hPCRF returning an "IP-CAN session modification acknowledgement" message to the vPCRF1 to issue the modified PCC policy;

712b, the vPCRF1 modifying the PCC policy according to the local policy, and then forwarding a acknowledgement message to the P-GW;

713b, since the AF does not change after the switch, the AF transmitting an "application/service information" request message carrying IP address and APN to the vPCRF1;

714b, the vPCRF1 finding the stored records of the IP-CAN session according to the IP address and APN and forwarding the message to the hPCRF;

715b, the hPCRF obtaining the service information to generate a PCC policy and a QoS policy, and returning an acknowledgement message to the vPCRF1 to issue these policies;

716b, the vPCRF1 modifying the issued policies according to the local policy, and then forwarding the modified policies to the AF by the acknowledgement message;

In the above example, if the UE switches to an untrusted non-3GPP to access, then steps 703a-710a and steps 701b-708b will be omitted.

Based on the principle of the present invention, many variations can be made to the above examples, for example:

(1): in Example One to Example Three, the indication of IP-CAN session establishment message is transmitted prior to the gateway control session establishment message; in other examples, the gateway control session establishment message may be transmitted prior to the indication of IP-CAN session establishment message, correspondingly, the DRA selects a PCRF for the IP-CAN session after receiving the gateway control session establishment message, and when the indication of IP-CAN session establishment message arrives, the message is forwarded using the PCRF previously selected.

(2): in the above examples, the IP-CAN session is uniquely identified with (NAI, IP address, APN), but the IP-CAN session may also be identified with (NAI, APN), (IP address, APN), etc.;

Additionally, NAI can be substituted by other UE IDs (identifiers), and APN can also be substituted by other PDN IDs.

(3) in Example Four, a method for selecting a PCRF when switching from access via E-UTRAN to access via trusted non-3GPP IP network or untrusted non-3GPP IP network is described taking a roaming architecture of Local Break as an example; the flow as for a Home Routed roaming architecture is substantially the same except that the corresponding message is directly transmitted to the hDRA as P-GW and AF are located in the home network.

Of course, the present invention can also have many other examples, and a person skilled in the art can make various corresponding modifications and alternations without departing from the spirit and essence of the present invention, but these corresponding modifications and alternations should all fall within the protection scope of the appended claims of the present invention.

INDUSTRIAL APPLICABILITY

Using the method for selecting a PCRF provided by the present invention, a single PCRF of a visited network and a home network can be selected for an IP-CAN session of a UE when the UE is in a roaming state of Home Routed or Local Break.

What we claim is:

1. A method for selecting a policy and charging rules function, comprising:
when a User Equipment (UE) accesses a 3GPP system through an Evolved-Universal Terrestrial Radio Access Network (E-UTRAN) of a visited network or a trusted non-3GPP IP access network or untrusted non-3GPP IP access network,
upon receiving a session establishment request message sent by a Policy and Charging Control (PCC) client located in the visited network, a Diameter Routing Agent (DRA) of the visited network searching records stored locally, and if records of an Internet Protocol-Connectivity Access Network (IP-CAN) session corresponding to the session establishment request message are not found, the DRA of the visited network selecting a Policy and Charging Rules Function (PCRF) of the visited network for the IP-CAN session and records a corresponding relationship between the IP-CAN session and the PCRF of the visited network; and forwarding the session establishment request message to the selected PCFR of the visited network or instructing the PCC client to transmit the session establishment request message to the selected PCRF of the visited network; if the records of the IP-CAN session are found, the DRA of the visited network forwarding the message to the PCRF of the visited network corresponding to the records, or instructing the PCC client to transmit the message to the PCRF of the visited network corresponding to the records; and
the PCRF of the visited network forwarding the session establishment request message to a DRA of a home network, upon receiving the session establishment request message sent by the PCRF of the visited network, the DRA of the home network searching records stored locally, and if the records of the IP-CAN session are not found, the DRA of the home network selecting the PCRF of the home network for the IP-CAN session and recording the corresponding relationship between the IP-CAN session and the PCRF of the home network, and forwarding the session establishment request message to the selected PCRF of the home network or instructing the PCRF of the visited network to transmit the session establishment request message to the selected PCRF of the home network, if the records of the IP-CAN session are found, the DRA of the home network forwards the message to the PCRF of the home network corresponding to the records, or instructs the PCRF of the visited network to transmit the message to the PCRF of the home network corresponding to the records; or when searching records stored locally and finding that the PCRF of the home network has already been selected for the IP-CAN session, the PCRF of the visited network forwarding the session establishment request message to the selected PCRF of the home network.

2. The method according to claim 1, wherein,
when the UE accesses the 3GPP system through an untrusted non-3GPP IP access network, the PCC client comprises: Policy and Charging Enforcement Function (PCEF) and Application Function (AF), and when the UE accesses the 3GPP system through the E-UTRAN or trusted non-3GPP IP access network, the PCC client further comprises Bearer Binding and Event Reporting Function (BBERF);
the session establishment request message sent by the PCEF is an indication of Internet Protocol-Connectivity Access Network (IP-CAN) session establishment message; the session establishment request message sent by the BBERF is a gateway control session establishment indication message; the session establishment request message sent by the AF is an application/service information message.

3. The method according to claim 1, wherein,
if receiving the indication of IP-CAN session establishment message, the PCRF of the visited network forwards the message to the DRA of the home network;
if receiving the gateway control session establishment indication message or the application/service information message, the PCRF of the visited network forwards the message to the DRA of the home network, or transmits the message to the corresponding PCRF of the home network according to stored corresponding relationship between the IP-CAN session and the PCRF of the home network.

4. The method according to claim 2, further comprising:
upon receiving the indication of IP-CAN session establishment message sent by the DRA of the home network, the PCRF of the home network generating a corresponding PCC policy, and containing the PCC policy into an IP-CAN session establishment acknowledgement message, and forwarding the IP-CAN session establishment acknowledgement message to the PCEF through the DRA of the home network, the PCRF of the visited network and the DRA of the visited network;
upon receiving the indication of IP-CAN session establishment message sent by the PCRF of the visited network, the PCRF of the home network generating a corresponding PCC policy and containing the PCC policy into the IP-CAN session establishment acknowledgement message, and forwarding the IP-CAN session establishment acknowledgement message to the PCEF through the PCRF of the visited network.

5. The method according to claim 2, further comprising:
upon receiving the gateway control session establishment message sent by the DRA of the home network, the PCRF of the home network generating a corresponding Quality of Service (QoS) policy and containing the QoS policy into a gateway control session establishment acknowledgement message, and forwarding the gateway control session establishment acknowledgement message to the BBERF through the DRA of the home network, the PCRF of the visited network and the DRA of the visited network;

upon receiving the gateway control session establishment message sent by the PCRF of the visited network, the PCRF of the home network generating a corresponding QoS policy and containing the QoS policy into the a gateway control session establishment acknowledgement message, and forwarding the gateway control session establishment acknowledgement message to the PCEF through the PCRF of the visited network.

6. The method according to claim 2, further comprising:
upon receiving the application/service information message sent by the DRA of the home network, the PCRF of the home network storing service information contained therein for generating a PCC policy and returning an acknowledgement message to the AF through the DRA of the home network, the PCRF of the visited network and the DRA of the visited network;

upon receiving the application/service information message sent by the PCRF of the visited network, the PCRF of the home network storing service information contained therein for generating a PCC policy and returning an acknowledgement message to the AF through the PCRF of the visited network.

7. The method according to claim 2, wherein, when the UE switches from the E-UTRAN to the trusted or untrusted non-3GPP IP access network to access the 3GPP system, or switches inversely,
upon receiving an IP-CAN session modification message sent by the PCEF located in the visited network, the DRA of the visited network forwards the IP-CAN session modification message to the corresponding PCRF of the visited network according to stored records of the IP-CAN session; the PCRF of the visited network forwards the P-CAN session modification message to the DRA of the home network according to UE ID contained in the IP-CAN session modification message, or according to a corresponding relationship locally recorded between the IP-CAN session and the DRA of the home network;

upon receiving the IP-CAN session modification message, the DRA of the home network forwards the IP-CAN session modification message to the corresponding PCRF of the home network according to stored records of the IP-CAN session; the PCRF of the home network modifies the PCC policy of the IP-CAN session, and contains the modified PCC policy into an IP-CAN session modification acknowledgement message, and transmits the IP-CAN session modification acknowledgement message to the PCEF through the DRA of the home network, the PCRF of the visited network and the DRA of the visited network.

8. The method according to claim 2, further comprising:
when the UE switches from the E-UTRAN to the trusted or untrusted non-3GPP IP access network to access the 3GPP system, or switches inversely:
upon receiving an IP-CAN session modification message sent by the PCEF located in the visited network, the PCRF of the visited network forwarding the IP-CAN session modification message to the corresponding PCRF of the home network according to stored records of the IP-CAN session; and
the PCRF of the home network modifying a PCC policy of the IP-CAN session, and containing the modified PCC policy into an IP-CAN session modification acknowledgement message, and transmitting the IP-CAN session modification acknowledgement message to the PCEF through the PCRF of the visited network.

9. The method according to claim 1, wherein,
the DRA of the visited network instructing the PCC client to transmit the session establishment request message to the selected PCRF of the visited network means: the DRA of the visited network transmitting a redirection message carrying a PCRF address of the visited network to the PCC client, and the PCC client transmitting the session establishment request message to the PCRF of the visited network after receiving the redirection message;

the DRA of the home network instructing the PCRF of the visited network to transmit the session establishment request message to the selected PCRF of the home network means: the DRA of the home network transmitting a redirection message carrying a PCRF address of the home network to the PCRF of the visited network, and the PCRF of the visited network transmitting the session establishment request message to the PCRF of the home network after receiving the redirection message.

* * * * *